(12) United States Patent
Baur et al.

(10) Patent No.: US 8,504,265 B2
(45) Date of Patent: Aug. 6, 2013

(54) SYSTEM AND METHOD FOR DECREASING ACCELERATION DISTURBANCE DURING TRANSMISSION UPSHIFTS

(75) Inventors: Andrew W. Baur, Whitmore Lake, MI (US); Craig J. Hawkins, Howell, MI (US); Michael J. Pitsch, Ann Arbor, MI (US)

(73) Assignee: GM Global Technology Operations LLC

( * ) Notice: Subject to any disclaimer, the term of this patent is extended or adjusted under 35 U.S.C. 154(b) by 21 days.

(21) Appl. No.: 13/241,662

(22) Filed: Sep. 23, 2011

(65) Prior Publication Data

US 2012/0296537 A1     Nov. 22, 2012

Related U.S. Application Data

(60) Provisional application No. 61/488,464, filed on May 20, 2011.

(51) Int. Cl.
| | |
|---|---|
| *B60W 10/11* | (2012.01) |
| *B60W 30/188* | (2012.01) |
| *B60W 30/19* | (2012.01) |
| *F16H 63/50* | (2006.01) |

(52) U.S. Cl.
CPC ............ *B60W 30/19* (2013.01); *F16H 63/502* (2013.01)
USPC .......................................................... 701/54

(58) Field of Classification Search
CPC ............................ B60W 30/19; F16H 63/502
See application file for complete search history.

(56) References Cited

U.S. PATENT DOCUMENTS

| | | | | |
|---|---|---|---|---|
| 7,503,875 | B2* | 3/2009 | Fujii et al. ..................... | 477/107 |
| 7,651,440 | B2* | 1/2010 | Runde ............................ | 477/143 |
| 7,925,406 | B2* | 4/2011 | Asami et al. ................... | 701/51 |

OTHER PUBLICATIONS

Kim et al. "Smooth shift control of automatic transmissions using a robust adaptive scheme with intelligent supervision", Int. J. of Vehicle Design, vol. 32. Nos. 3/4, 2003, pp. 250-272.*

* cited by examiner

*Primary Examiner* — James Trammell
*Assistant Examiner* — Todd Melton (57) ABSTRACT

A control system for an engine includes a torque phase detection module, a torque request generation module, and an engine torque control module. The torque phase detection module detects a start of a torque phase of an upshift of a transmission coupled to the engine. The torque request generation module generates an engine torque request at the start of the torque phase of the transmission upshift. The engine torque control module controls engine torque during the torque phase of the transmission upshift based on the engine torque request.

20 Claims, 6 Drawing Sheets

SYSTEM AND METHOD FOR DECREASING ACCELERATION DISTURBANCE DURING TRANSMISSION UPSHIFTS

CROSS-REFERENCE TO RELATED APPLICATIONS

This application claims the benefit of U.S. Provisional Application No. 61/488,464, filed on May 20, 2011. The disclosure of the above application is incorporated herein by reference in its entirety.

FIELD

The present disclosure relates to internal combustion engines and more particularly to a system and method for decreasing acceleration disturbance during transmission upshifts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft and generate drive torque. The drive torque is transferred from the crankshaft to a driveline (e.g., wheels) of a vehicle via a transmission. The transmission may be coupled to the crankshaft via a fluid coupling such as a torque converter. The transmission includes a plurality of gear ratios for translating the drive torque generated at the crankshaft to a desired drive torque at the vehicle driveline. For example, the desired drive torque may be based on engine operating parameters such as engine speed/load, vehicle speed, throttle position, etc. An upshift of the transmission refers to a shift from a gear having a higher gear ratio to a gear having a lower gear ratio.

SUMMARY

A control system for an engine includes a torque phase detection module, a torque request generation module, and an engine torque control module. The torque phase detection module detects a start of a torque phase of an upshift of a transmission coupled to the engine. The torque request generation module generates an engine torque request at the start of the torque phase of the transmission upshift. The engine torque control module controls engine torque during the torque phase of the transmission upshift based on the engine torque request.

A method for controlling an engine includes detecting a start of a torque phase of an upshift of a transmission coupled to the engine, generating an engine torque request at the start of the torque phase of the transmission upshift, and controlling engine torque during the torque phase of the transmission upshift based on the engine torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Automatic transmissions may include a plurality of clutches that selectively engage/disengage one or more of a plurality of gears to achieve a desired gear ratio. A gear ratio may be defined as a ratio of transmission input shaft speed (TISS) to transmission output shaft speed (TOSS). As previously described, an upshift of a transmission refers to a gear shift from a lower gear having a higher gear ratio to a higher gear having a lower gear ratio, such as a gear shift from $2^{nd}$ gear to $3^{rd}$ gear, $3^{rd}$ gear to $4^{th}$ gear, etc.

An upshift includes two phases: a torque phase and an inertia phase. During the torque phase, an on-coming clutch starts from zero torque and ramps up to a clutch torque that is high enough to hold a current gear ratio, while an off-going clutch releases its holding capacity. During the inertia phase (following the torque phase), the on-coming clutch continues to engagement. The engagement of the on-coming clutch causes the current gear ratio to change toward the gear ratio of an on-coming gear associated with the on-coming clutch.

When upshifting between gear ratios of the transmission, the output torque of the transmission decreases during the torque phase as the on-coming clutch gains capacity. To offset this drop of output torque, the engine torque may be increased to a desired engine torque corresponding to the gear ratio of the on-coming gear. Typical control systems increase the engine torque during the inertia phase of the upshift (i.e., while the speed ratio changes). Increasing engine torque during the inertia phase of the upshift, however, results in an increase of transmission output torque after the decrease of output torque during the torque phase, which effectively causes a delay or disturbance in vehicle acceleration (also known as a "torque hole").

Accordingly, a system and method are presented for decreasing acceleration disturbance during transmission upshifts. The system and method may request an increase in engine torque based on a state of an upshift. More specifically, the system and method may increase engine torque during a torque phase of the upshift (i.e., before the inertia phase) thereby providing for smoother vehicle acceleration throughout the torque phase of the transmission upshift. The system and method may then control the engine torque during the inertia phase to a final engine torque (associated with an on-coming gear ratio) thereby providing for smoother vehicle acceleration throughout the inertia phase of the transmission upshift.

Figure 1:
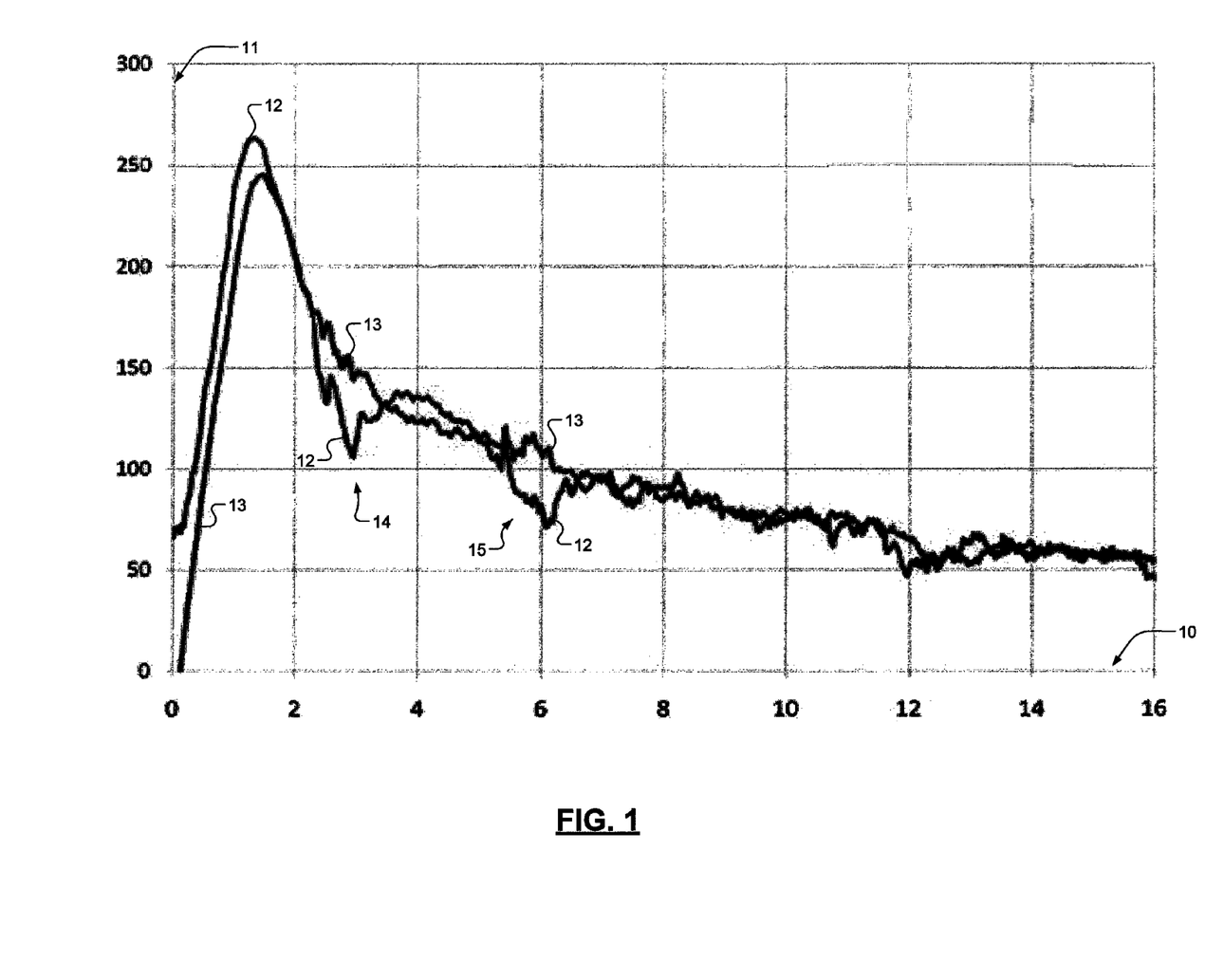
FIG. 1 illustrates simulations of conventional engine torque control during transmission upshifts and engine torque control during transmission upshifts according to one implementation of the present disclosure.

For example, FIG. 1 illustrates simulations of both conventional engine torque control during transmission upshifts and engine torque control during transmission upshifts according to the system or method of the present disclosure. A horizontal axis 10 represents time (e.g., in seconds) and a vertical axis 11 represents transmission output shaft acceleration (e.g., in units per square second). Line 12 represents simulated conventional engine torque control during transmission upshifts. As shown, line 12 has torque holes during a $1^{st}$ gear to $2^{nd}$ gear upshift (indicated by reference 14) and during a $2^{nd}$ gear to $3^{rd}$ gear upshift (indicated by reference 15). Line 13, on the other hand, represents simulated engine torque control during transmission upshifts according to the system or method of the present disclosure. As shown, line 13 does not have torque holes during either transmission upshift 14 and 15 and therefore achieves smoother vehicle acceleration (i.e., no vehicle acceleration disturbances).

Figure 2:
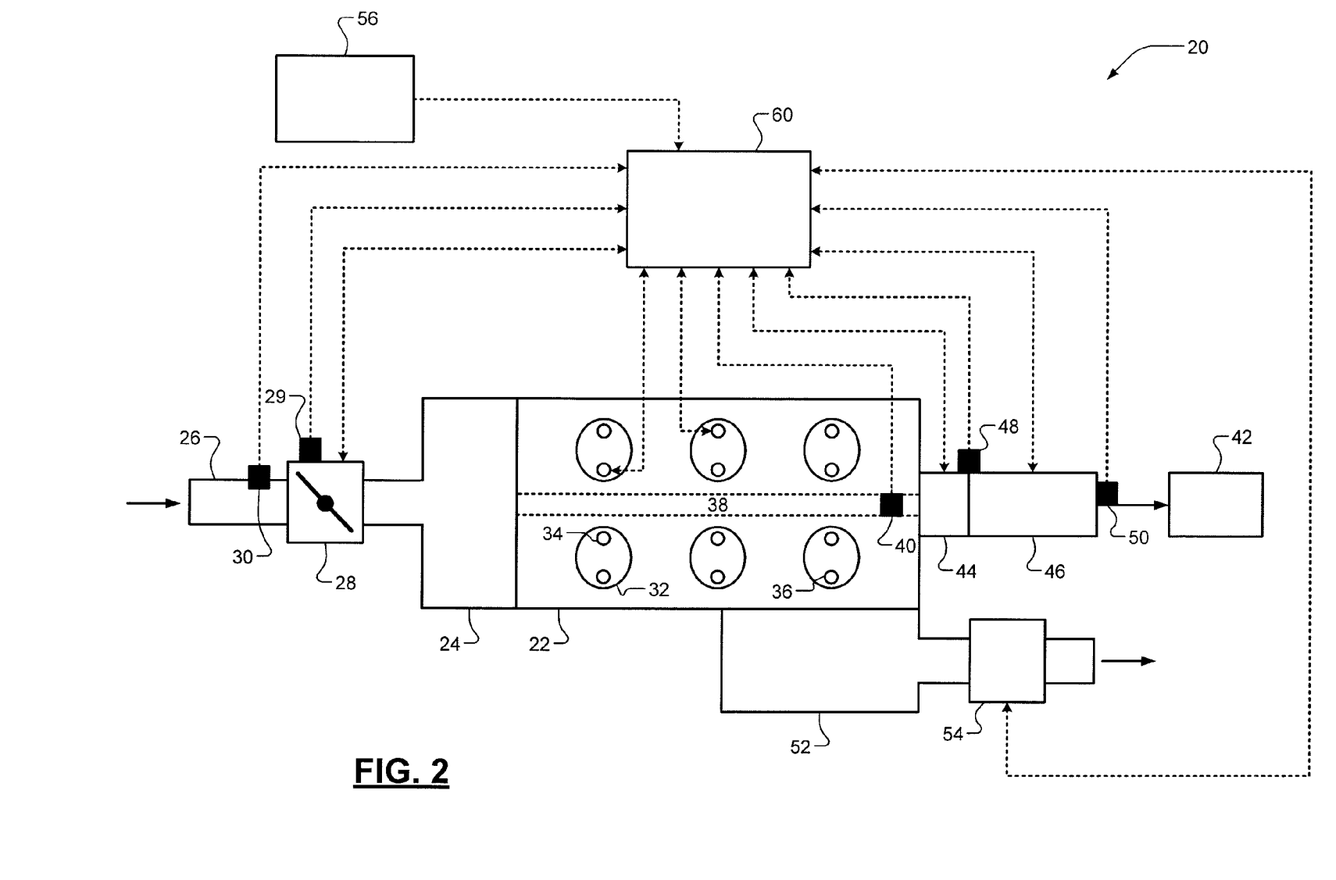
FIG. 2 is a functional block diagram of an example engine system according to one implementation of the present disclosure.

Referring now to FIG. 2, an example engine system 20 includes an engine 22. The engine 22 may be a spark ignition (SI) engine, a diesel engine, a homogeneous charge compression ignition (HCCI) engine, or another suitable type of engine. The engine system 20 may also be a hybrid system and therefore may include additional components such as an electric motor and a battery system.

The engine 22 draws air into an intake manifold 24 through an induction system 26 that may be regulated by a throttle 28. For example, the throttle 28 may be electrically controlled via electronic throttle control (ETC). A throttle position sensor (TPS) 29 measures a position of the throttle 28. A mass air flow (MAF) sensor 30 measures MAF through the throttle 28. For example, the measured MAF may indicate a load on the engine 22. The air in the intake manifold 24 is distributed to a plurality of cylinders 32 and combined with fuel to create an air/fuel (A/F) mixture. While six cylinders are shown, the engine 22 may have other numbers of cylinders.

Fuel injectors 34 may inject the fuel to create the A/F mixture. For example, the fuel injectors 34 may inject the fuel into intake ports of the cylinders 32, respectively, or directly into the cylinders 32, respectively. The A/F mixture is compressed by pistons (not shown) within the cylinders 32. Depending on the type of engine 22, spark plugs 36 may ignite the compressed A/F mixture. Alternatively, the A/F mixture may be compressed until auto-ignition occurs. The combustion of the A/F mixture within the cylinders drives the pistons (not shown) which rotatably turn a crankshaft 38 and generate drive torque. An engine speed sensor 40 measures a rotational speed of the crankshaft 38 (e.g., in revolutions per minute, or RPM).

The drive torque at the crankshaft 38 is transferred to a driveline 42 of a vehicle via a transmission 46. For example, the transmission 46 may be coupled to the crankshaft 38 via a fluid coupling such as a torque converter (TC) 44. However, the transmission 46 may also be directly coupled (i.e., dry coupled) to the crankshaft 38 (e.g., a dry dual clutch transmission, or dry DCT). The transmission 46 may be any suitable type of transmission including two or more clutches. The transmission 46 further includes a plurality of gear ratios for translating the drive torque at the output of the torque converter 44 (i.e., an input shaft of the transmission 46) to a desired drive torque at the driveline 42 (i.e., at an output shaft of the transmission 46).

A TISS sensor 48 measures a rotational speed of an input shaft of the transmission 46 (i.e., the rotational speed at the output of the torque converter 44). A TOSS sensor 50 measures a rotational speed of an output shaft of the transmission 46 (i.e., the rotational speed of the vehicle driveline 42). For example, the measured TOSS may be used to determine a speed of the vehicle. Alternatively, however, another suitable sensor (e.g., a wheel speed sensor) may measure the speed of the vehicle.

Exhaust gas resulting from combustion is expelled from the cylinders 32 into an exhaust manifold 52. The exhaust gas in the exhaust manifold 52 may be treated by an exhaust treatment system 54 before being released into the atmosphere. For example, the exhaust treatment system 54 may include at least one of an oxidation catalyst (OC), nitrogen oxide (NOx) adsorbers/absorbers, a lean NOx trap, a selective catalytic reduction (SCR) system, a particulate matter (PM) filter, and a three-way catalytic converter. A driver input module 56 translates input from the driver of the vehicle (e.g., via an accelerator pedal) for a control module 60.

The control module 60 controls operation of the engine system 20. The control module 60 may receive signals from the throttle 28, the MAF sensor 30, the fuel injectors 34, the spark plugs 36, the engine speed sensor 40, the torque converter 44, the transmission 46, the TISS sensor 48, the TOSS sensor 50, the exhaust treatment system 54, and/or the driver input module 56. The control module 60 may control the throttle 28, the fuel injectors 34, the spark plugs 36, the torque converter 44, the transmission 46, and/or the exhaust treatment system 54. The control module 60 may also implement the system or method of the present disclosure.

Figure 3:
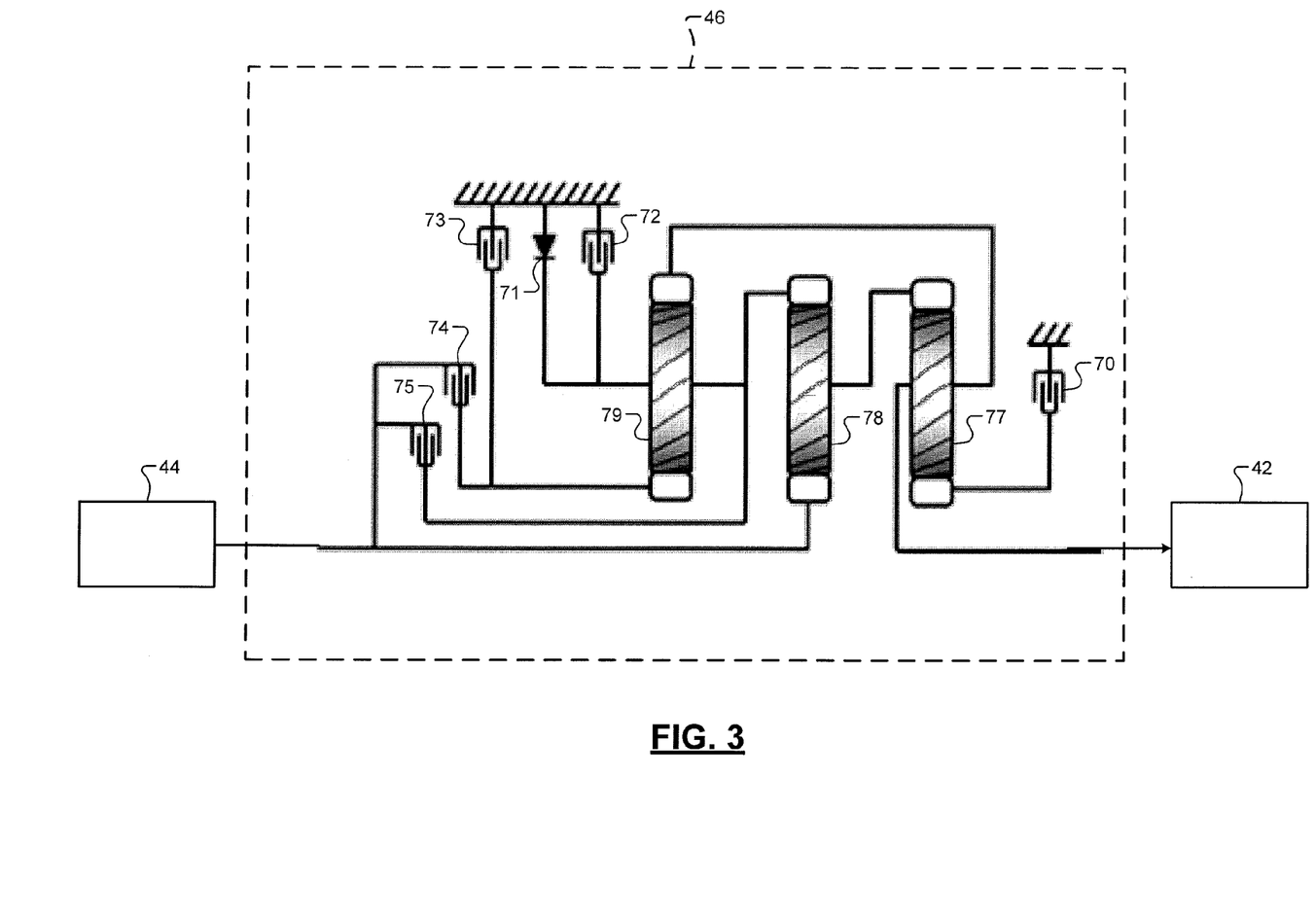
FIG. 3 is a schematic of an example automatic transmission according to one implementation of the present disclosure.

Referring now to FIG. 3, an example of the transmission 46 is shown. Specifically, FIG. 3 illustrates a six-speed automatic transmission. As previously described, the transmission 46 transfers drive torque from the torque converter 44 to the driveline 42. The transmission 46 includes six clutches 70, 71, 72, 73, 74, and 75, respectively, and three gears 77, 78, and 79, respectively. For example only, gear 77 may have a higher gear ratio than gears 78 and 79, and gear 78 may have a higher gear ratio than gear 79. The transmission 46 may also include other components such as, for example only, ring gears, sun gears, carrier gears, servos, etc. The control module 60 selectively engages or disengages one or more of the clutches 70-75 to engage/disengage one or more of the gears 77-79 thereby achieving a desired gear ratio for translating input torque (from torque converter 44) to output torque (to driveline 42).

Clutch 70 may also be referred to as clutch F1 or a freewheeler clutch. The freewheeler clutch 70 allows the transmission 46 to achieve a first gear ratio (i.e., gear 77) by engaging clutch 71. Clutch 71 may also be referred to as clutch CB1234 because clutch 71 is engaged to achieve each of gear ratios corresponding to gears 1, 2, 3, and 4. In addition, clutch 71 is also a braking clutch as denoted by the B in CB1234. Clutch 72 may also be referred to as clutch CBLR because clutch 72 is engaged to achieve a gear ratio corresponding to a reverse (R) gear. Clutch 73 may also be referred to as clutch CB26 because clutch 73 is engaged to achieve each of gear ratios corresponding to gears 2 and 6. Clutch 74 may also be referred to as clutch C35R because clutch 74 is engaged to achieve each of gear ratios corresponding to gears 3, 5, and R. Lastly, clutch 75 may also be referred to as clutch C456 because clutch 75 is engaged to achieve each of gear ratios corresponding to gears 4, 5, and 6.

Figure 4:
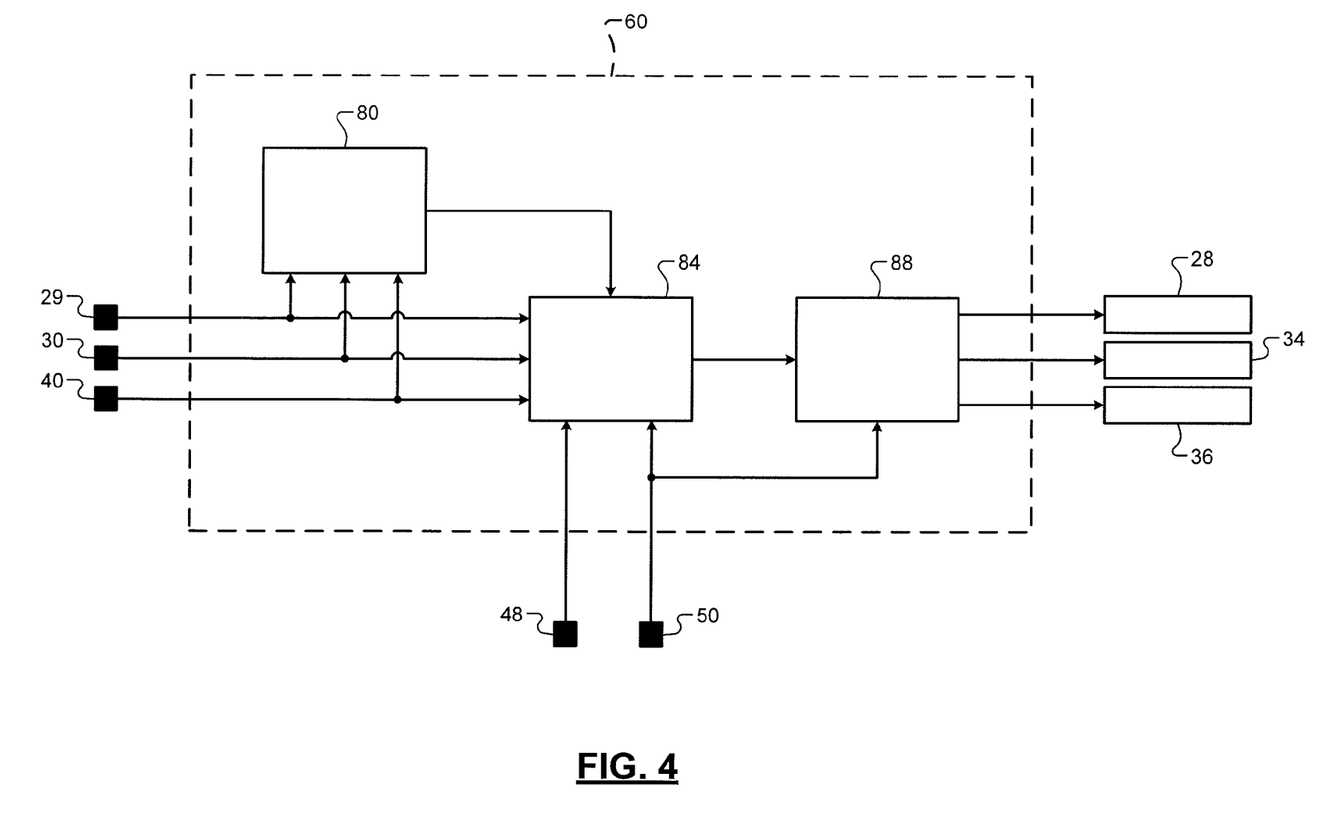
FIG. 4 is a functional block diagram of an example control module according to one implementation of the present disclosure.

Referring now to FIG. 4, an example of the control module 60 is shown. The control module 60 may include a torque phase detection module 80, a torque request generation module 84, and an engine torque control module 88.

The torque phase detection module 80 detects a start of an upshift of the transmission 46. More specifically, the torque phase detection module 80 detects a start of a torque phase of the upshift of the transmission 46. The torque phase detection module 80 may generate a signal to notify the torque request generation module 84 that the start of the upshift/torque phase has been detected. For example, the start of the upshift/torque phase may be detected based on operating parameters such as throttle position, engine speed/load, vehicle speed, driver input, etc.

The torque request generation module 84 may receive the signal generated by the torque phase detection module 80. When the signal is received, the torque request generation module 84 generates an engine torque request for the engine torque control module 88. The engine torque request may be based on engine/transmission operating parameters such as throttle position, engine speed/load, vehicle speed, driver input, etc. In addition, the engine torque request may be based on other operating parameters such as TISS and TOSS.

However, when a desired engine torque corresponding to the engine torque request is greater than a threshold, the torque request generation module 84 may abandon/discard the engine torque request. In other words, in this instance the torque request generation module 88 may not send the engine torque request to the engine torque control module 88. The threshold may be based on a driver torque request and a predetermined threshold. More specifically, the threshold may be a sum of the driver torque request and the predetermined threshold. For example, the driver torque request may be based on driver input 56 or other operating parameters such as throttle position or engine load. Additionally, in some implementations the torque request generation module 84 may abandon/discard the engine torque request when the corresponding desired engine torque is less than another threshold.

The engine torque control module 88 may receive the engine torque request from the torque request generation module 84. When received, the engine torque control module 88 may control engine torque based on the engine torque request. Specifically, the engine torque control module 88 may increase engine torque during the torque phase to the desired engine torque corresponding to the engine torque request. In addition, the engine torque control module 88 may increase the engine torque to the desired engine torque during the torque phase at a predetermined rate. In other words, the engine torque control module 88 may gradually increase the engine torque throughout the torque phase at the predetermined rate.

At an end of the torque phase (i.e., at a beginning of the inertia phase) of the transmission upshift, the engine torque control module 88 may control engine torque to a final engine torque. The final engine torque may represent an engine torque level corresponding to the on-coming clutch and the on-coming gear (i.e., the new gear ratio). For example, the engine torque control module 88 may increase engine torque from the desired engine torque to the final engine torque during the inertia phase. In other words, the engine torque control module 88 may control engine torque during the inertia phase to maintain constant vehicle acceleration. Therefore, for example, the engine torque control module 88 may monitor the vehicle speed (e.g., TOSS) when controlling the engine torque during the inertia phase of the transmission upshift.

Figure 5:
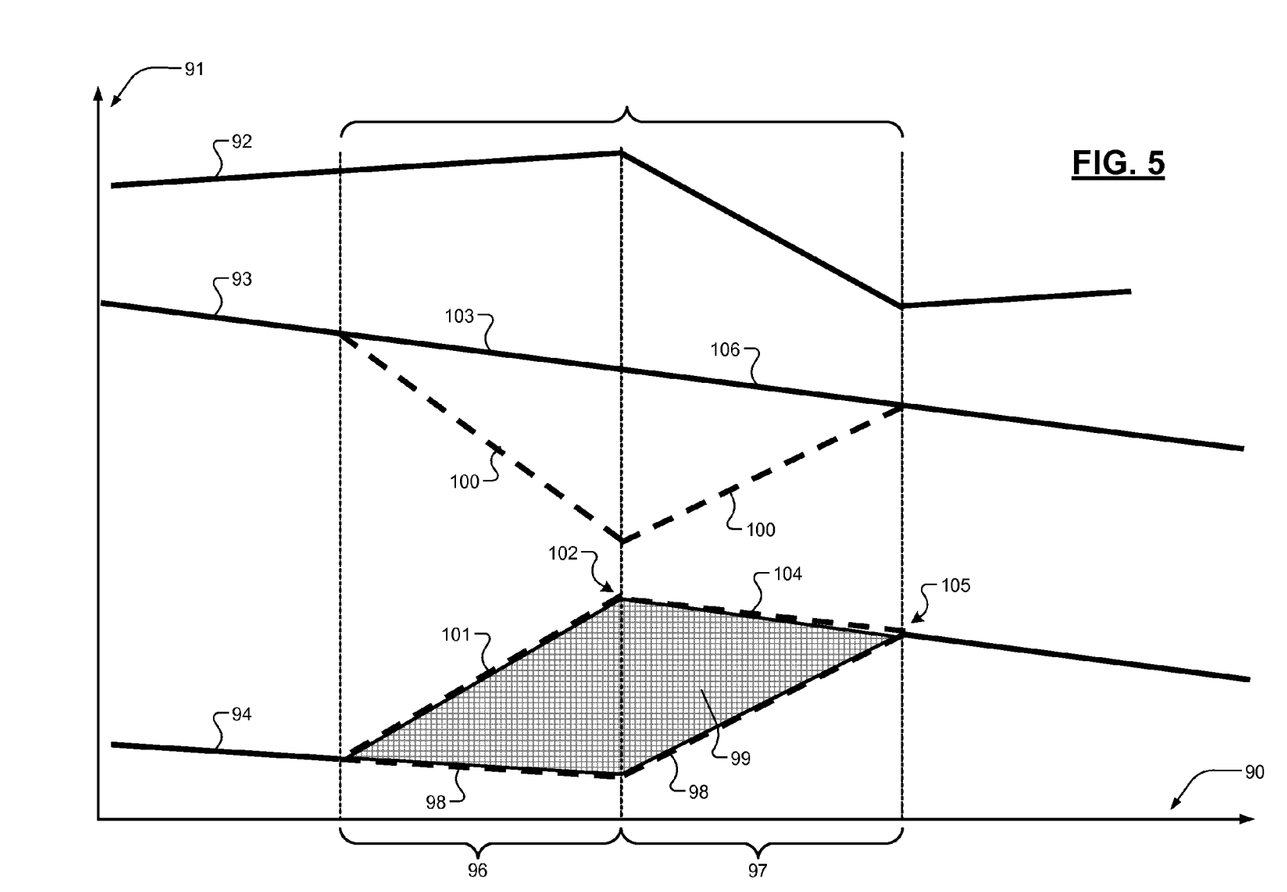
FIG. 5 illustrates simulated engine torque control during a transmission upshift according to one implementation of the present disclosure.

Referring now to FIG. 5, a simulation of engine torque control during a transmission upshift is shown. A horizontal axis 90 represents time (e.g., in seconds) and a vertical axis 91 represents engine speed 92, vehicle acceleration 93, and engine torque 94. A transmission upshift period 95 is divided into a torque phase 96 and an inertia phase 97. Line 98 indicates conventional engine torque control during the transmission upshift 95 (i.e., increasing engine torque during the inertia period 97). As shown, the conventional engine torque control 98 creates a torque hole 99, which causes a vehicle acceleration disturbance 100.

Conversely, line 101 indicates engine torque control during the transmission upshift according to the system or method of the present disclosure. More specifically, engine torque is increased during the torque phase 96 to a desired engine torque 102 (i.e., in response to a generated torque request). The increase in engine torque during the torque phase 96 maintains constant vehicle acceleration 103 during the torque phase 96. In addition, line 104 indicates controlling engine torque to a final engine torque 105 during the inertia period 97. The control of engine torque during the inertia phase 97 maintains constant vehicle acceleration 106 during the inertia phase 97.

Figure 6:
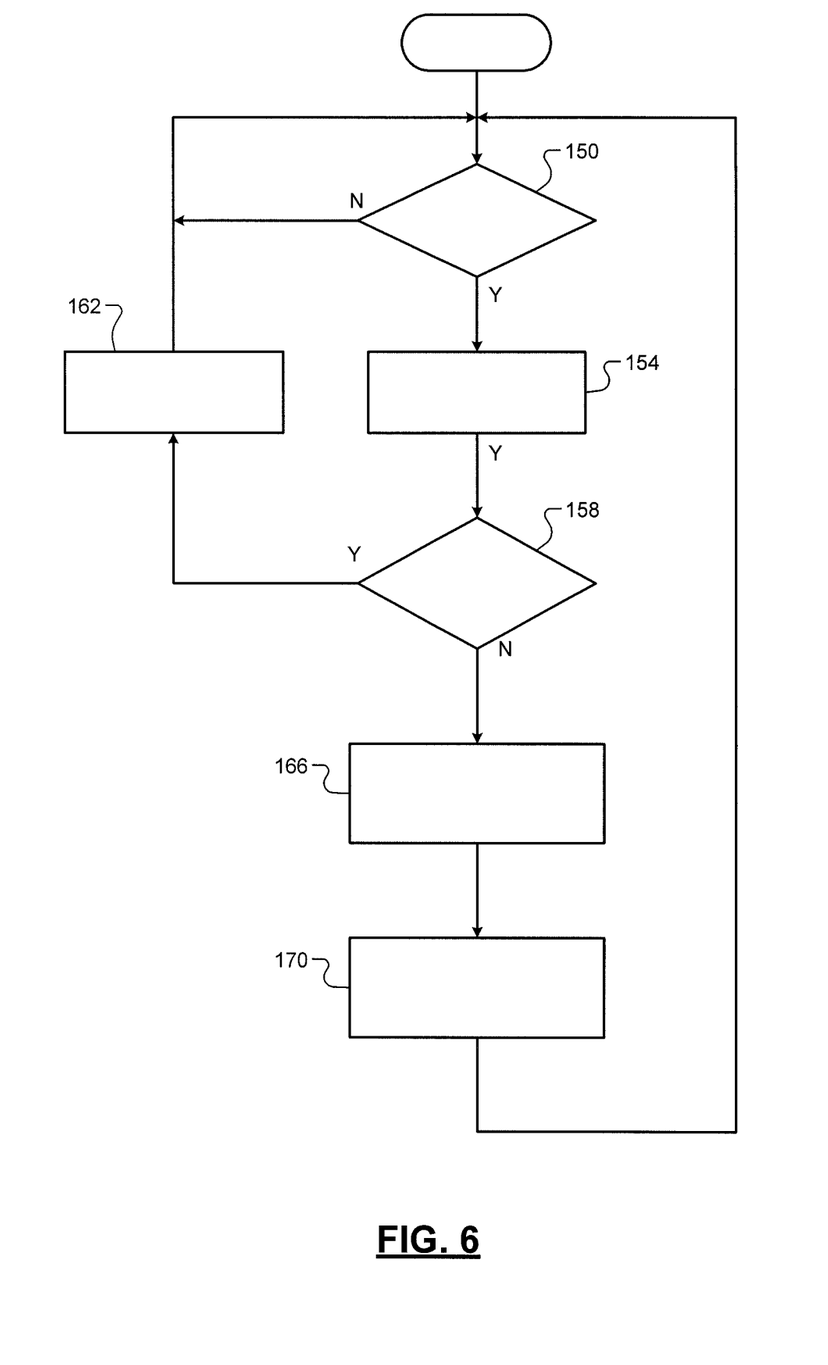
FIG. 6 is a flow diagram illustrating an example method for decreasing acceleration disturbance during a transmission upshift according to one implementation of the present disclosure.

Referring now to FIG. 6, an example method for decreasing vehicle acceleration disturbance during transmission upshifts begins at 150. At 150, the control module 60 determines whether a torque phase of a transmission upshift is starting. If true, control may proceed to 154. If false, control may return to 150. At 154, the control module 60 generates an engine torque request ($T_{REQ}$) based on engine/transmission operating parameters. At 158, the control module 60 determines whether the engine torque request $T_{REQ}$ is greater than a threshold (Threshold) (i.e., a sum of a driver torque request and a predetermined torque offset). If true, control may proceed to 162. If false, control may proceed to 166.

At 162, the control module 60 discards/abandons the engine torque request and complete the transmission upshift according to suitable methods. Control may then return to 150. At 166, the control module 60 increases engine torque during the torque phase of the transmission upshift to a desired engine torque corresponding to the engine torque request $T_{REQ}$. At 170, the control module 60 controls engine torque during the inertia phase of the transmission upshift to a final engine torque where the transmission upshift is complete. Control may then return to 150.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
   a torque phase detection module that detects a start of a torque phase of an upshift of a transmission coupled to the engine;
   a torque request generation module that selectively generates an engine torque request at the start of the torque phase of the transmission upshift; and
   an engine torque control module that selectively controls engine torque during the torque phase of the transmission upshift based on the engine torque request, wherein the engine torque control module controls engine torque during the torque phase independent from the engine torque request when a desired engine torque corresponding to the engine torque request is greater than a predetermined threshold.

2. The control system of claim 1, wherein:
   the torque request generation module does not generate the engine torque request when the desired engine torque corresponding to the engine torque request is greater than the predetermined threshold; and
   the predetermined threshold is equal to a sum of a driver torque request and a predetermined engine torque offset.

3. The control system of claim 1, wherein the engine torque control module increases engine torque to the desired engine torque corresponding to the engine torque request during the torque phase of the transmission upshift.

4. The control system of claim 3, wherein the engine torque control module increases engine torque to the desired engine torque at a predetermined rate.

5. The control system of claim 4, wherein the engine torque control module controls engine torque during an inertia phase of the transmission upshift to a final engine torque corresponding to a new gear ratio, wherein the inertia phase of the transmission upshift is after the torque phase of the transmission upshift.

6. The control system of claim 5, wherein an off-going clutch of the transmission is disengaged during the torque phase of the upshift, and wherein an on-coming clutch of the transmission is engaged during the inertia phase of the upshift.

7. The control system of claim 5, wherein the engine torque control module increases engine torque during the inertia phase of the transmission upshift from the desired engine torque to the final engine torque.

8. The control system of claim 7, wherein the engine torque control module controls engine torque during the inertia phase of the upshift to maintain constant vehicle acceleration.

9. The control system of claim 1, wherein the engine torque request is based on at least one of a plurality of operating parameters.

10. The control system of claim 9, wherein the plurality of operating parameters include engine load, throttle position, engine speed, transmission input shaft speed (TISS), and transmission output shaft speed (TOSS).

11. A method for controlling an engine, the method comprising:
    detecting a start of a torque phase of an upshift of a transmission coupled to the engine;
    selectively generating an engine torque request at the start of the torque phase of the transmission upshift;
    selectively controlling engine torque during the torque phase of the transmission upshift based on the engine torque request; and
    controlling engine torque during the torque phase independent from the engine torque request when a desired engine torque corresponding to the engine torque request is greater than a predetermined threshold.

12. The method of claim 11, further comprising not generating the engine torque request when the desired engine torque corresponding to the engine torque request is greater than the predetermined threshold, wherein the predetermined threshold is equal to a sum of a driver torque request and a predetermined engine torque offset.

13. The method of claim 11, further comprising increasing engine torque to the desired engine torque corresponding to the engine torque request during the torque phase of the transmission upshift.

14. The method of claim 13, further comprising increasing engine torque to the desired engine torque at a predetermined rate.

15. The method of claim 14, further comprising controlling engine torque during an inertia phase of the transmission upshift to a final engine torque corresponding to a new gear ratio, wherein the inertia phase of the transmission upshift is after the torque phase of the transmission upshift.

16. The method of claim 15, wherein an off-going clutch of the transmission is disengaged during the torque phase of the upshift, and wherein an on-coming clutch of the transmission is engaged during the inertia phase of the upshift.

17. The method of claim 15, further comprising increasing engine torque during the inertia phase of the transmission upshift from the desired engine torque to the final engine torque.

18. The method of claim 17, further comprising controlling engine torque during the inertia phase of the upshift to maintain constant vehicle acceleration.

19. The method of claim 11, wherein the engine torque request is based on at least one of a plurality of operating parameters.

20. The method of claim 19, wherein the plurality of operating parameters include engine load, throttle position, engine speed, transmission input shaft speed (TISS), and transmission output shaft speed (TOSS).

\* \* \* \* \*